(12) United States Patent
Okubo

(10) Patent No.: US 8,953,614 B2
(45) Date of Patent: Feb. 10, 2015

(54) DATA COMMUNICATION SYSTEM AND ADDRESS SETTING METHOD FOR SETTING AN IP ADDRESS

(75) Inventor: Hiroshi Okubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/472,046

(22) Filed: May 15, 2012

(65) Prior Publication Data

US 2012/0294190 A1 Nov. 22, 2012

(30) Foreign Application Priority Data

May 19, 2011 (JP) ................................. 2011-112773

(51) Int. Cl.
*H04L 12/28* (2006.01)
*H04L 29/12* (2006.01)
(52) U.S. Cl.
CPC .......... *H04L 61/103* (2013.01); *H04L 61/6022* (2013.01); *H04L 61/2007* (2013.01)
USPC .......................................... 370/395.3; 709/245
(58) Field of Classification Search
CPC .................................................. H04L 61/2007
USPC .................. 370/351, 389, 392, 395.2, 395.3, 370/395.54; 709/220, 222–225, 238, 245
See application file for complete search history.

(56) References Cited

U.S. PATENT DOCUMENTS

2001/0039590 A1* 11/2001 Furukawa et al. ............ 709/238
2007/0100970 A1*  5/2007 Wang et al. ................... 709/220

FOREIGN PATENT DOCUMENTS

JP    2001-285305 A    10/2001
JP    2007-235826 A     9/2007

* cited by examiner

*Primary Examiner* — Curtis A Alia
(74) *Attorney, Agent, or Firm* — Canon USA, Inc., IP Division

(57) ABSTRACT

To set an IP address to an apparatus existing beyond a router, a first apparatus requests a second apparatus via the router to set an IP address to a third apparatus. Upon reception of the request, the second apparatus sets to the third apparatus the IP address instructed by the first apparatus.

8 Claims, 9 Drawing Sheets

FIG. 2
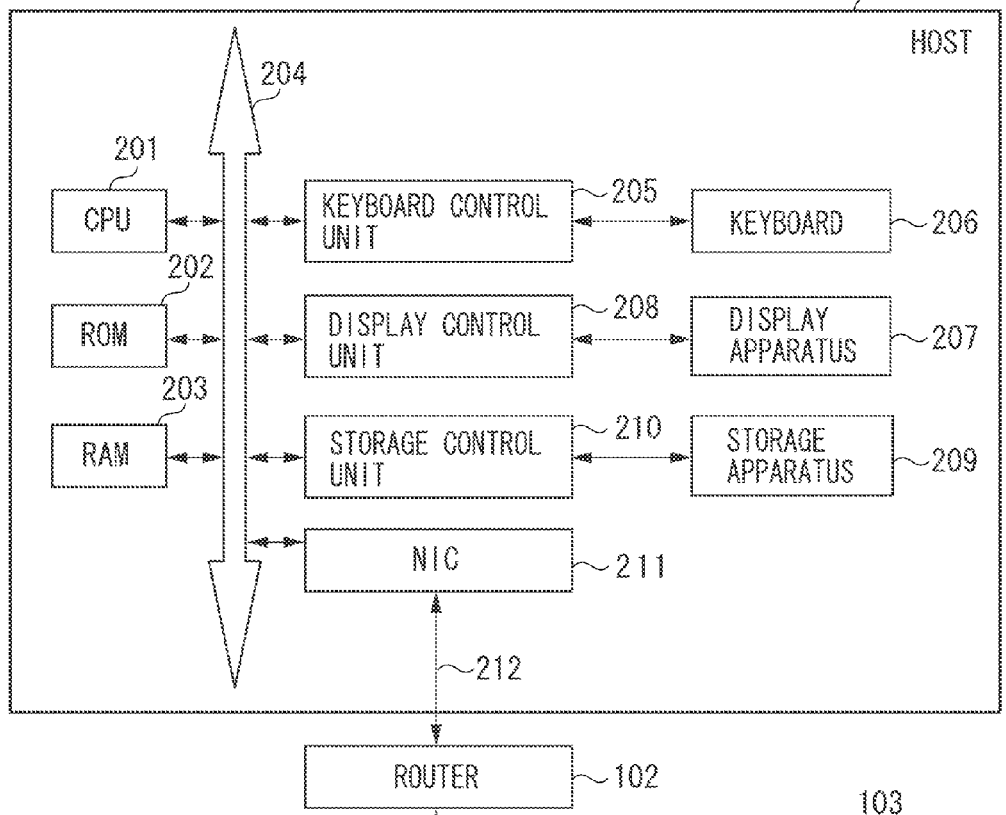
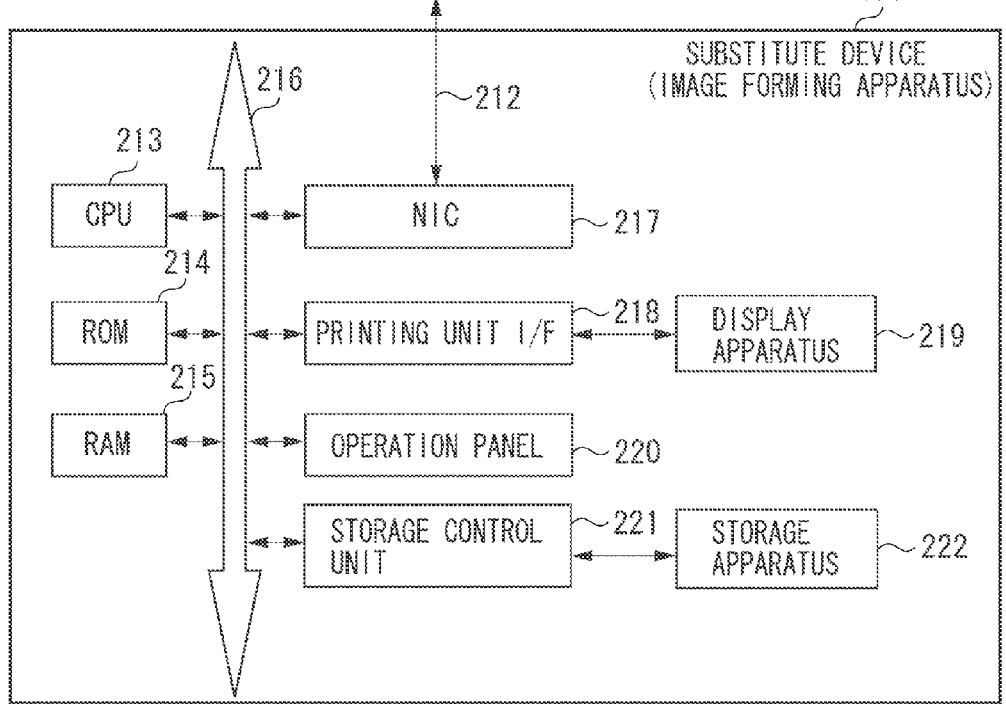

FIG. 6

| NETWORK DEVICE LIST | | |
|---|---|---|
| IP ADDRESS | MAC ADDRESS | PRINTER NAME |
| UNSET | 00:00:85:11:22:33 | Printer A |
| 10.0.2.23 | 00:00:85:11:22:31 | Printer B |
| 10.0.1.20 | 00:00:85:11:22:32 | Printer C |

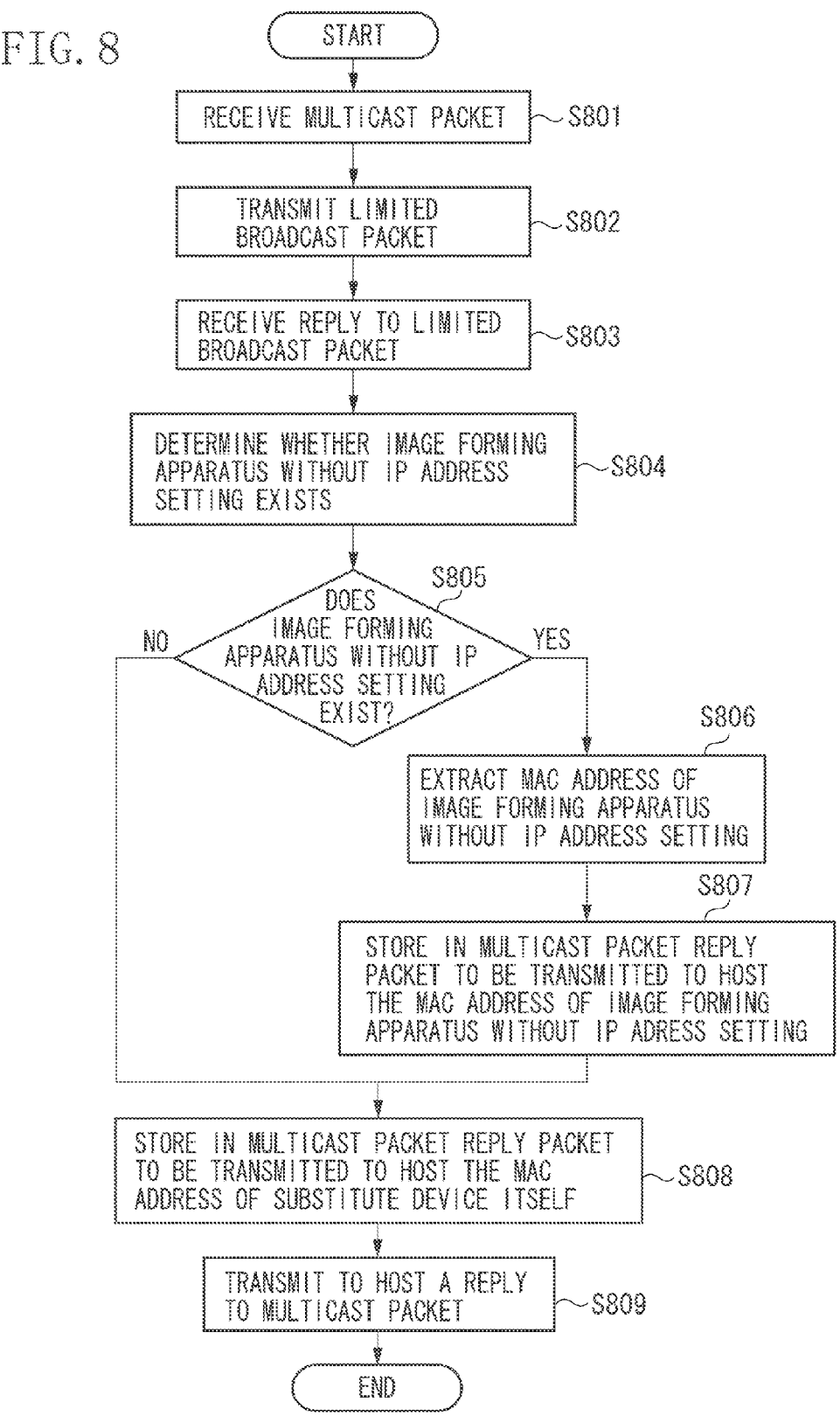

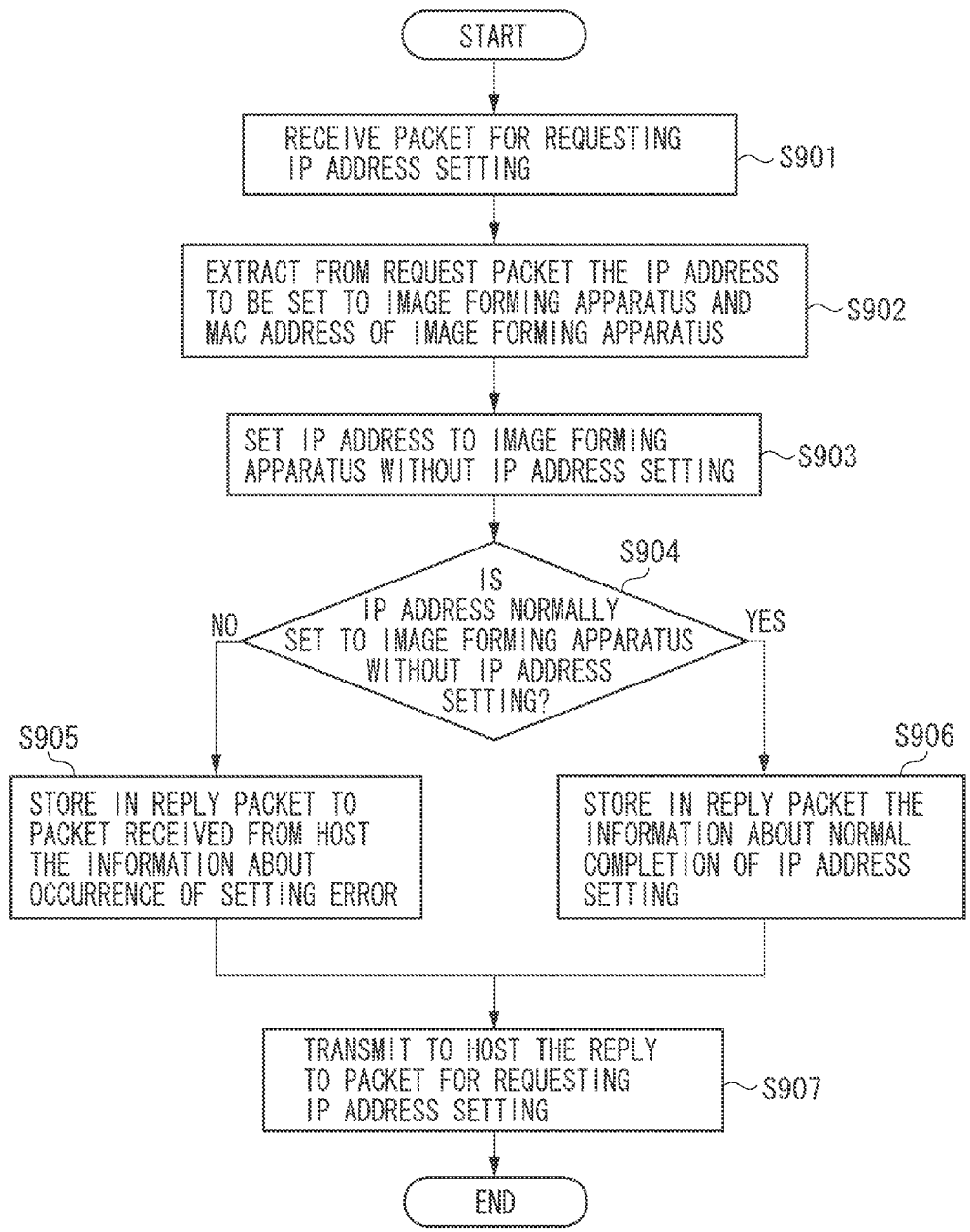

US 8,953,614 B2

DATA COMMUNICATION SYSTEM AND ADDRESS SETTING METHOD FOR SETTING AN IP ADDRESS

BACKGROUND OF THE INVENTION

1. Field of the Invention

The present invention relates to a data communication system and an address setting method for setting an internet protocol (IP) address to an apparatus which exists beyond a router.

2. Description of the Related Art

When connecting a new apparatus to a network, it is necessary to set an IP address to enable the apparatus to perform suitable communication on the network. Further, in communication between different subnets, apparatuses can communicate with each other via a router. A technique discussed in Japanese Patent Application Laid-Open No. 2001-285305 is known as a conventional technique for setting an IP address to an apparatus connected to a network environment having different subnets. The technique discussed in Japanese Patent Application Laid-Open No. 2001-285305 acquires a media access control (MAC) address of an apparatus subjected to IP address setting by using a multicast packet, and sets an IP address to the apparatus.

However, the technique discussed in Japanese Patent Application Laid-Open No. 2001-285305 is based on the premise that a host can receive a reply to a multicast packet from a printer subjected to IP address setting. However, some routers do not transfer a reply to a multicast packet from an apparatus having no valid IP address setting. Therefore, under such an environment, the technique discussed in Japanese Patent Application Laid-Open No. 2001-285305 cannot set an IP address to an apparatus connected to a different subnet network.

SUMMARY OF THE INVENTION

The present invention is directed to providing a data communication system and an address setting method which have resolved the above-mentioned problems of the conventional technique.

The present invention is further directed to providing a data communication system and an address setting method being capable of setting an IP address to an apparatus which exists beyond a router which does not transfer a packet from an apparatus having no valid IP address setting.

According to an aspect of the present invention, a data communication system includes a first apparatus having a valid IP address setting, and a second apparatus having a valid IP address setting connected with the first apparatus via a router, wherein the first apparatus includes an specification unit configured to identify a third apparatus subjected to the valid IP address setting of the first apparatus, and a request unit configured to request the second apparatus to set a predetermined IP address to the third apparatus identified by the specification unit, and wherein the second apparatus includes a reception unit configured to receive the request by the request unit, and a setting unit configured to set the predetermined IP address to the third apparatus identified by the specification unit based on the request received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a configuration of a host, a substitute device, and an image forming apparatus.

FIGS. 6 and 7 illustrate example display screens by the host.

FIGS. 8 and 9 are flowcharts illustrating the processing by the substitute device.

DESCRIPTION OF THE EMBODIMENTS

Various exemplary embodiments, features, and aspects of the invention will be described in detail below with reference to the drawings.

Figure 1:
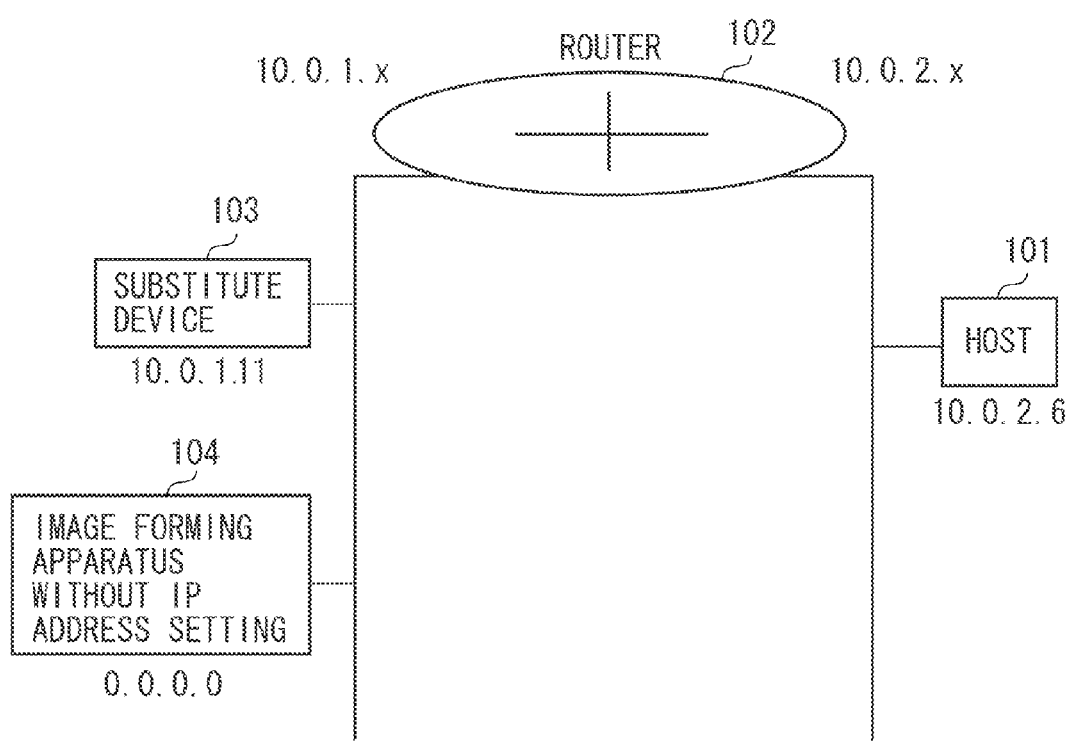
FIG. 1 illustrates a network environment according to the present exemplary embodiment of the present invention.

FIG. 1 illustrates a TCP/IP-based network environment according to the present exemplary embodiment of the present invention. Suppose that a host 101 (connected to one subnet network environment) is connected via a router 102 with a substitute device 103 and an image forming apparatus 104 having no IP address setting (connected to another subnet network environment) as illustrated in FIG. 1. Suppose that the host 101 is connected to a network having an IP address 10.0.2.x, and has a valid IP address setting 10.0.2.6. The host 101 is implemented by a general-purpose personal computer (PC), which sets an IP address to other apparatuses. Suppose that the substitute device 103 is connected to a network having an IP address 10.0.1.x, and has a valid IP address setting 10.0.11. Although the substitute device 103 is implemented by an image forming apparatus such as a printer, the substitute device 103 is not limited thereto and may be a PC. The image forming apparatus 104 having no IP address setting and the substitute device 103 are connected to a network of the same subnets. A valid IP address is not set to the image forming apparatus 104 having no IP address setting.

The router 102 is supposed not to transfer to a network having other subnets a packet received from a communication apparatus having no valid network communication setting. The router 102 manages a list of valid IP addresses, etc. to determine the validity of each IP address according to the list. Referring to FIG. 1, suppose that an irrelevant IP address 0.0.0.0 is set to the image forming apparatus 104, but not limited to this, for example, an invalid gateway address is set, so that the image forming apparatus 104 cannot suitably communicate with an apparatus beyond the router 102. Although the host 101, the substitute device 103, and the image forming apparatus 104 have been described as communication apparatuses, additional communication apparatuses may be connected.

Detailed descriptions on known processing such as name resolution processing, frame reconfiguration processing in the router 102, etc. will be omitted.

FIG. 2 is a block diagram illustrating a configuration of the host 101 and the substitute device 103 illustrated in FIG. 1. The configuration of the image forming apparatus 104 is similar to the configuration of the substitute device 103.

Referring to FIG. 2, the substitute device 103 includes a central processing unit (CPU) 201, a read-only memory (ROM) 202, a random access memory (RAM) 203, a keyboard control unit 205, a display control unit 208, a storage control unit 210, and a network interface controller (NIC) 211 which are all capable of communicating with each other via a CPU bus 204. The CPU 201 loads a necessary program from the ROM 202 and the storage apparatus 209 into the RAM 203 and then executes it to control the operation of the host 101. The RAM 203 is used as a work area for the CPU 201, and stores various data for the operation of the host 101. A keyboard 206 includes key groups for enabling user operations. The keyboard control unit 205 informs the CPU 201 of the details of an operation performed on the keyboard 206 by the user. The display apparatus 207 displays information which should be provided to the user. The display control unit 208 receives from the CPU 201 information to be displayed on the display apparatus 207, and sends the information to the display apparatus 207 to display it. The storage apparatus 209 can store control programs to be executed by the CPU 201 and various information such as image data. The storage control unit 210 controls writing and reading information to/from the storage apparatus 209 based on an instruction from the CPU 201.

The NIC 211 is connected with the router 102 on a local area network (LAN) 212 to control communication via networks. Specifically, the NIC 211 can transmit and receive data to/from a network on a subnet to which the NIC 211 itself belongs, and to/from a network on other subnets via the router 102. Various information necessary for the NIC 211 to perform communication via networks, such as MAC address, IP address, subnet mask, gateway address, etc. are stored in the storage apparatus 209.

The substitute device 103 (image forming apparatus 104) includes a CPU 213, a ROM 214, a RAM 215, a NIC 217, a printing unit interface (I/F) 218, an operation panel 220, and a storage control unit 221 which are all capable of communicating with each other via a CPU bus 216. The CPU 213 loads a program stored in the ROM 214 and the storage apparatus 222 into the RAM 215 and then executes it to control the operation of the substitute device 103 (image forming apparatus 104). The RAM 215 is used as a work area for the CPU 213, and stores various data for the operation of the substitute device 103 (image forming apparatus 104). The NIC 217 is connected with the router 102 on the LAN 212 to control communication via networks. Specifically, the NIC 217 can transmit and receive data to/from a network on a subnet to which the NIC 217 itself belongs, and to/from a network on other subnets via the router 102. Various information used by the NIC 217 to perform communication via networks, such as MAC address, IP address, subnet mask, gateway address, etc. are stored in the storage apparatus 222.

A printing unit 219 prints an image according to input image data on a print medium by using recording agents such as ink and toner. A printing unit I/F 218 supplies image data of print target to the printing unit 219, and informs the CPU 213 of the information about status of the printing unit 219. The operation panel 220 includes key groups for receiving a user operation and a display unit for displaying information which should be provided to the user. The storage apparatus 222 can store control programs to be executed by the CPU 213 and various information such as image data. The storage control unit 221 controls writing and reading information to/from the storage apparatus 222 based on an instruction from the CPU 213.

The image forming apparatuses according to the present exemplary embodiment (including the substitute device 103 and the image forming apparatus 104) have functions of accepting a request for IP address setting and setting an IP address to other apparatuses.

Figure 3:
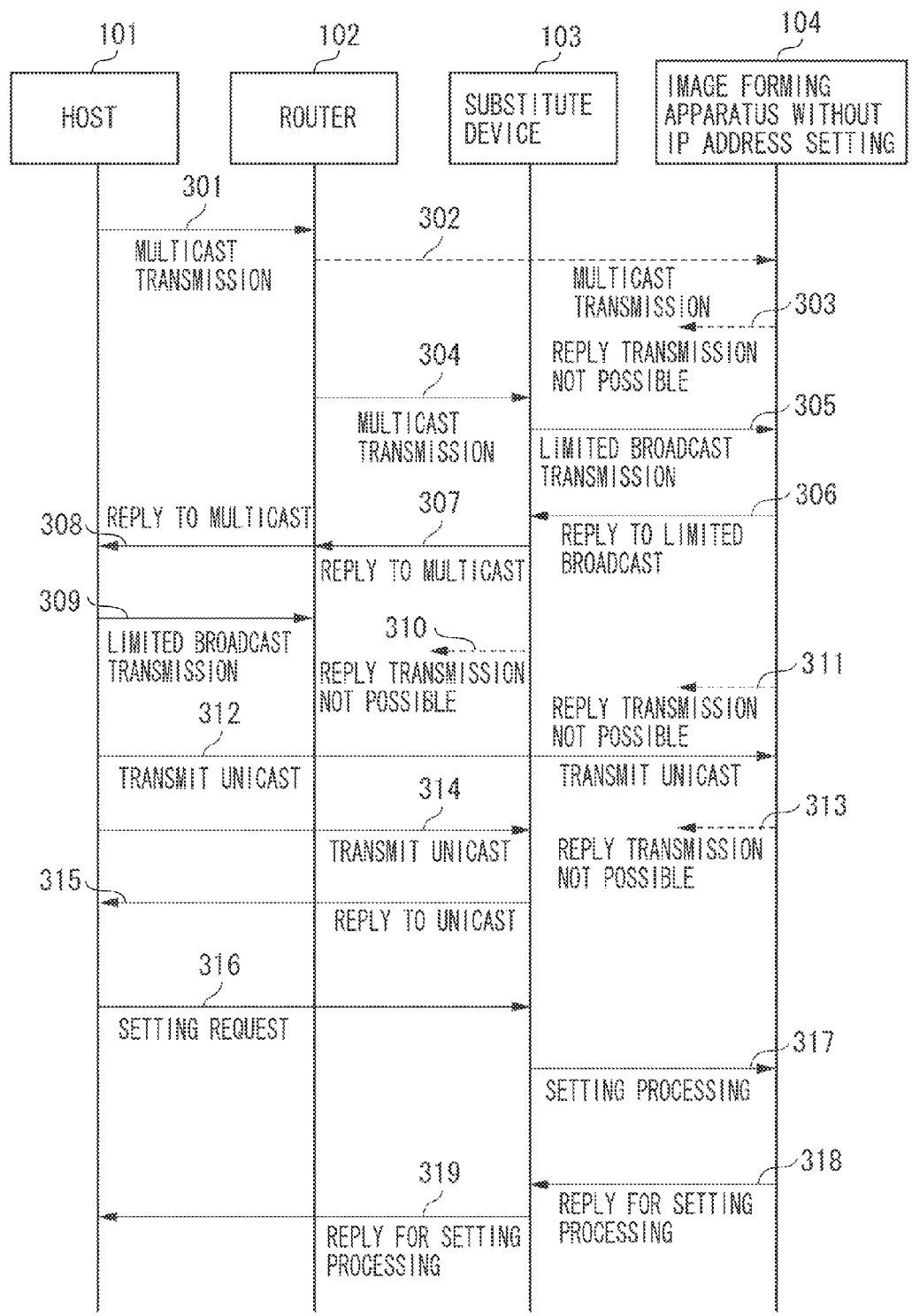
FIG. 3 is a sequence diagram illustrating data transmission and reception processing by each apparatus according to the present exemplary embodiment of the present invention.

Processing for setting a valid IP address to the image forming apparatus 104 based on an instruction from the host 101 will be described below. In the present exemplary embodiment, the router 102 does not transfer to the host 101 a reply by the image forming apparatus 104 in response to a packet transmitted from the host 101. Therefore, the router 102 instructs the substitute device 103, installed in the same subnet as the image forming apparatus 104, to set an IP address to the image forming apparatus 104. FIG. 3 is a sequence diagram illustrating relevant processing by the host 101, the router 102, the substitute device 103, and the image forming apparatus 104.

First of all, in step 301, the host 101 transmits to the router 102 a multicast packet (or a directed broadcast packet) to a predetermined range to search for an image forming apparatus having no IP address setting. In this case, the host 101 sets such a time-to-live (TTL) value that a packet is transmitted at least beyond the router 102. Suppose that, upon reception of this packet, a communication apparatus according to the present exemplary embodiment transmits a reply to the packet. Specifically, the communication apparatus according to the present exemplary embodiment determines the contents of the packet, recognizes the received packet as a packet for searching for an image forming apparatus having no IP address setting, and transmits a reply to the relevant packet. Upon reception of the packet received from the host 101 in step 301, the router 102 transmits the multicast packet to a communication apparatus existing in a subnet having an IP address 10.0.1.x. In this case, the router 102 transmits the packet to the image forming apparatus 104 (sequence 302) and the substitute device 103 (sequence 304). Since a valid IP address has not yet been set to the image forming apparatus 104, the router 102 does not transfer to the host 101 a packet having a transmission source of the image forming apparatus 104. Therefore, in step 303, the image forming apparatus 104 cannot transmit a reply to the multicast packet transmitted by the host 101 in step 301.

On the other hand, since the substitute device 103 has a valid IP address setting, the substitute device can reply to the multicast packet transmitted in step 301. In other words, the router 102 can transfer to the host 101 a reply to the multicast packet transmitted by the host 101 in step 301. However, since the multicast packet is a packet for searching for an image forming apparatus having no IP address setting, the substitute device 103, before transmitting a reply to the multicast packet, searches for an image forming apparatus having no IP address setting in a subnet having an IP address 10.0.1.x. Specifically, in step 305, the substitute device 103 transmits to the image forming apparatus 104 a limited broadcast packet for searching for an image forming apparatus having no IP address setting in a subnet having an IP address 10.0.1.x. This limited broadcast packet is transmitted only into a subnet having an IP address 10.0.1.x. Upon reception of the packet transmitted in step 305, in step 306, the image forming apparatus 104 transmits to the substitute device 103 a reply including the MAC address of the image forming apparatus 104 itself, indicating that the image forming apparatus 104 itself has no IP address setting. Thus, the substitute device 103 finds an image forming apparatus having no IP address setting existing in the same subnet as the substitute device 103 itself. In step 307, as a reply to the multicast packet transmitted in step 301, the substitute device 103 transmits to the router 102 a packet for notifying information about the substitute device 103 itself and information about the image forming apparatus 104, having a transmission destination of the host 101. The reply packet includes not only the IP address of the substitute device 103 but also the MAC address of the substitute device 103 and the image forming apparatus 104. Upon reception of the reply, in step 308, the router 102 transfers the reply to the host 101. Upon reception of the reply, the host 101 identifies the MAC address of the substitute device 103 and the image forming apparatus 104 subjected to IP address setting.

Upon reception of the reply transmitted in step 308, the host 101 cannot determine whether the substitute device 103 and the image forming apparatus 104 exist in the same subnet as the host 101 itself. Therefore, in step 309, the host 101 transfers to the router 102 a limited broadcast packet into the subnet to which the host 101 belongs, i.e., a subnet having an IP address 10.0.2.x. The host 101 checks whether the reply includes the MAC address of the substitute device 103 and the image forming apparatus 104 to determine whether these devices exist in the same subnet as the host 101 itself. In this case, since the host 101 does not receive a reply from the substitute device 101 or the image forming apparatus 104 (steps 310 and 311), the host 101 determines that these devices do not exist in the same subnet as the host 101. Instead of the above-described limited broadcast packet, the host 101 may transmit a directed broadcast packet or a multicast packet with the TTL value specified so that the packet is transmitted only into the same subnet as the host 101. The host 101 stores in the storage apparatus 209 information indicating the substitute device 103 and the image forming apparatus 104 found in this way.

If the host 101 knows the MAC address of the image forming apparatus 104, or if the host 101 knows the MAC address and IP address of the substitute device 103, some or all of the above-described processing can be omitted.

In step 312, to check whether an IP address has been set to the image forming apparatus 104 by any other apparatus, the host 101 transmits a unicast packet to the IP address to be set to the image forming apparatus 104 included in the packet received in step 308. In this case, assuming that a valid IP address has not been set to the image forming apparatus 104, in step 313, the router 102 does not transfer to the host 101 the reply packet from the image forming apparatus 104. Therefore, since a reply packet has not been received within a predetermined time, the host 101 determines that a valid IP address has not yet been set to the image forming apparatus 104.

In step 314, to make sure that communication with the substitute device 103 is possible, the host 101 transmits a unicast packet to the IP address of the substitute device 103 included in the packet received in step 308. In step 315, the substitute device 103 transmits to the router 102 a reply to the unicast packet, and the router 102 transfers the reply packet to the host 101. Upon reception of the reply packet, the host 101 determines that a valid IP address has been set to the substitute device 103 to enable communication with it.

Steps 314 and 315 are performed to improve the accuracy of a series of processing, and may be omitted. Specifically, as long as the host 101 can confirm the substitute device 103 and the image forming apparatus 104 based on the reply in step 308 and the reply to the broadcast packet transmitted in step 309, the host 101 may omit the unicast packet transmission in steps 312 and 314.

In step 316, the host 101 transmits to the substitute device 103 a unicast packet for requesting IP address setting to the image forming apparatus 104 having no IP address setting. Above described packet for requesting IP address setting includes the IP address of the image forming apparatus 104 and the IP address to be set to the image forming apparatus 104. Upon reception of the setting request packet, in step 317, the substitute device 103 accepts the request and sets the IP address to the image forming apparatus 104 based on the accepted request. Specifically, the substitute device 103 generates a packet having a transmission destination of the IP address included in the setting request packet, adds to the packet an instruction for setting the IP address specified by the host 101, and transmits the packet to the image forming apparatus 104. Upon reception of the packet, the image forming apparatus 104 stores in the storage apparatus 222 the IP address included in the received packet, and registers (sets) it as the IP address of the image forming apparatus 104 itself. In step 318, the image forming apparatus 104 transmits to the substitute device 103 the result (success or failure) of the processing of IP address setting. In step 319, the substitute device 103 replies to the host 101 with the received information.

The above-described processing enables setting a desired IP address to a communication apparatus having no IP address setting on another subnet connected via the general-purpose router 102. At the time of communication for this purpose, when a packet is transmitted, for example, via a specific port, it is not necessary to make special setting to the router 102 to transfer a packet from an apparatus having no valid IP address setting. Specifically, the present exemplary embodiment can be achieved through general-purpose packet communication via the router 102. However, it is useful that the above-described packet exchange is performed only by communication apparatuses corresponding to the present exemplary embodiment. Transmission timing and order of each packet illustrated in FIG. 3 are not limited thereto, and may be different timing and order as long as a similar result can be obtained.

The IP address to be set to the image forming apparatus 104 may be a predetermined IP address or one of IP addresses within a predetermined range.

Figure 4:
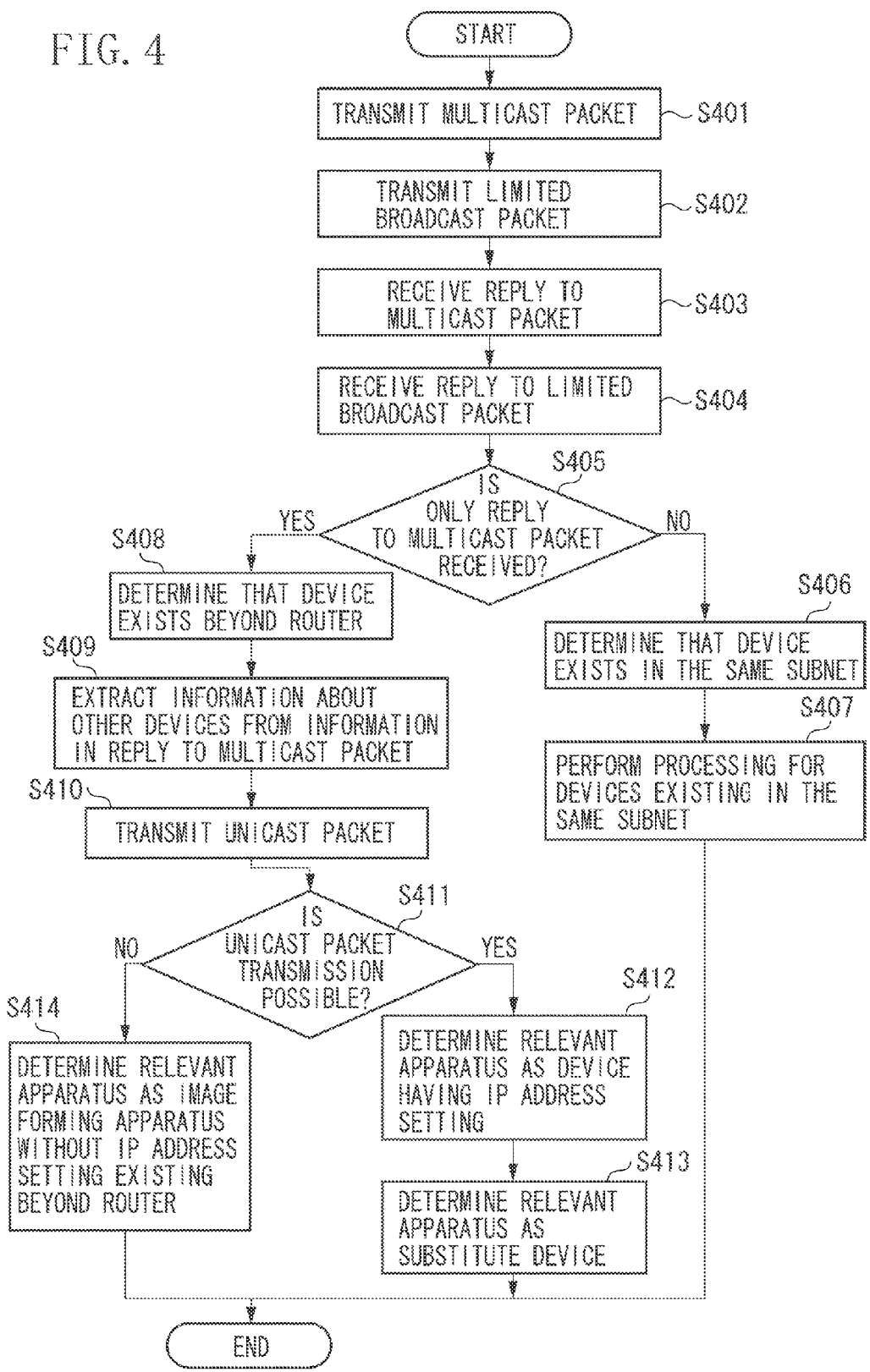
FIGS. 4 and 5 are flowcharts illustrating the processing by the host.

Processing performed by each apparatus will be described in detail below with reference to flowcharts. FIG. 4 is a flowchart illustrating the processing performed by the host 101. The flowchart illustrated in FIG. 4 is implemented when the CPU 201 loads a program from the ROM 202 and the storage apparatus 209 into the RAM 203 and then executes it.

In step S401, the host 101 transmits to the router 102 the multicast packet for searching for an image forming apparatus having no IP address setting (see step 301 in FIG. 3). In step S402, the host 101 transmits to the router 102 the limited broadcast packet for searching for a communication apparatus exiting in the same subnet (see step 309 in FIG. 3).

In step S403, the host 101 receives a reply to the multicast packet transmitted in step S401. In step S404, the host 101 receives a reply to the broadcast packet transmitted in step S402.

In step S405, based on the result of the receive processing in steps S403 and S404, the host 101 determines whether replies to both the multicast packet and the broadcast packet are received from an apparatus having the same MAC address, or only a reply to the multicast packet is received therefrom. When only a reply to the multicast packet is received (YES in step S405), the processing proceeds to step S408. Otherwise, when replies to both the multicast packet and the broadcast packet are received (NO in step S405), the processing proceeds to step S406. In this case, when replies are received from a plurality of apparatuses (MAC addresses), the host 101 performs the determination in step S405 for each apparatus.

In step S406, the host 101 determines that the apparatus which transmitted a reply to both the multicast packet and the broadcast packet exists in the same subnet as the host 101. If such an apparatus (not illustrated in FIG. 3) exists, in step S407, the host 101 applies to the apparatus the processing for devices existing in the same subnet. Specifically, when the relevant apparatus has no IP address setting, the host 101 directly instructs the relevant apparatus to set a desired IP address.

In step S408, the host 101 determines that the apparatus which transmitted a reply only to the multicast packet exists beyond the router 102. Specifically, the host determines that the relevant apparatus exists in a different subnet from the subnet in which the host 101 exists. Since the host 101 received in step 308 a reply to the multicast packet illustrated in step 301 in FIG. 3, but did not receive a reply to the broadcast packet illustrated in step 309 in FIG. 3, the host 101 determines that the substitute device 103 is the relevant apparatus. In step S409, the host 101 extracts information (such as MAC address) about apparatuses having no IP address setting included in the reply to the multicast packet (the reply received in step 308 in FIG. 3). When an apparatus equivalent to the substitute device 103 is not found, when an image forming apparatus having no IP address setting does not exist in the same subnet as the substitute device 103, the host 101 omits the processing in step S409 and subsequent steps.

In step S410, the host 101 transmits a unicast packet for confirming the substitute device to be requested for substitutional IP address setting and the image forming apparatus subjected to IP address setting. This step corresponds to the unicast packet transmission illustrated in steps 312 and 314 in FIG. 3. In step S411, the host 101 determines whether a reply to the unicast packet transmitted in step S410 is received. When the host 101 receives a reply to the unicast packet (YES in step S411), the processing proceeds to step S412. In step S412, the host 101 determines that the relevant apparatus has a valid IP address setting. In step S413, the host 101 determines that the relevant apparatus is capable of normal communication as a substitute device. The relevant apparatus is the substitute device 103 which transmitted to the host 101 the reply illustrated in step 315 in FIG. 3. When an apparatus having a valid IP address setting is not provided with a function of performing substitutional IP address setting, the host 101 omits the processing in step S413 and checks whether any other apparatus functions as a substitute device. Otherwise, when the host 101 does not receive a reply to the unicast packet (NO in step S411), the processing proceeds to step S414. In step S414, the host 101 determines that the relevant apparatus is an image forming apparatus having no IP address setting existing beyond the router 102.

As described above, the host 101 itself sets an IP address to an image forming apparatus having no IP address setting in the same subnet, and identifies the substitute device 103 and the image forming apparatus 104 having no IP address setting existing in a different subnet.

Figure 5:
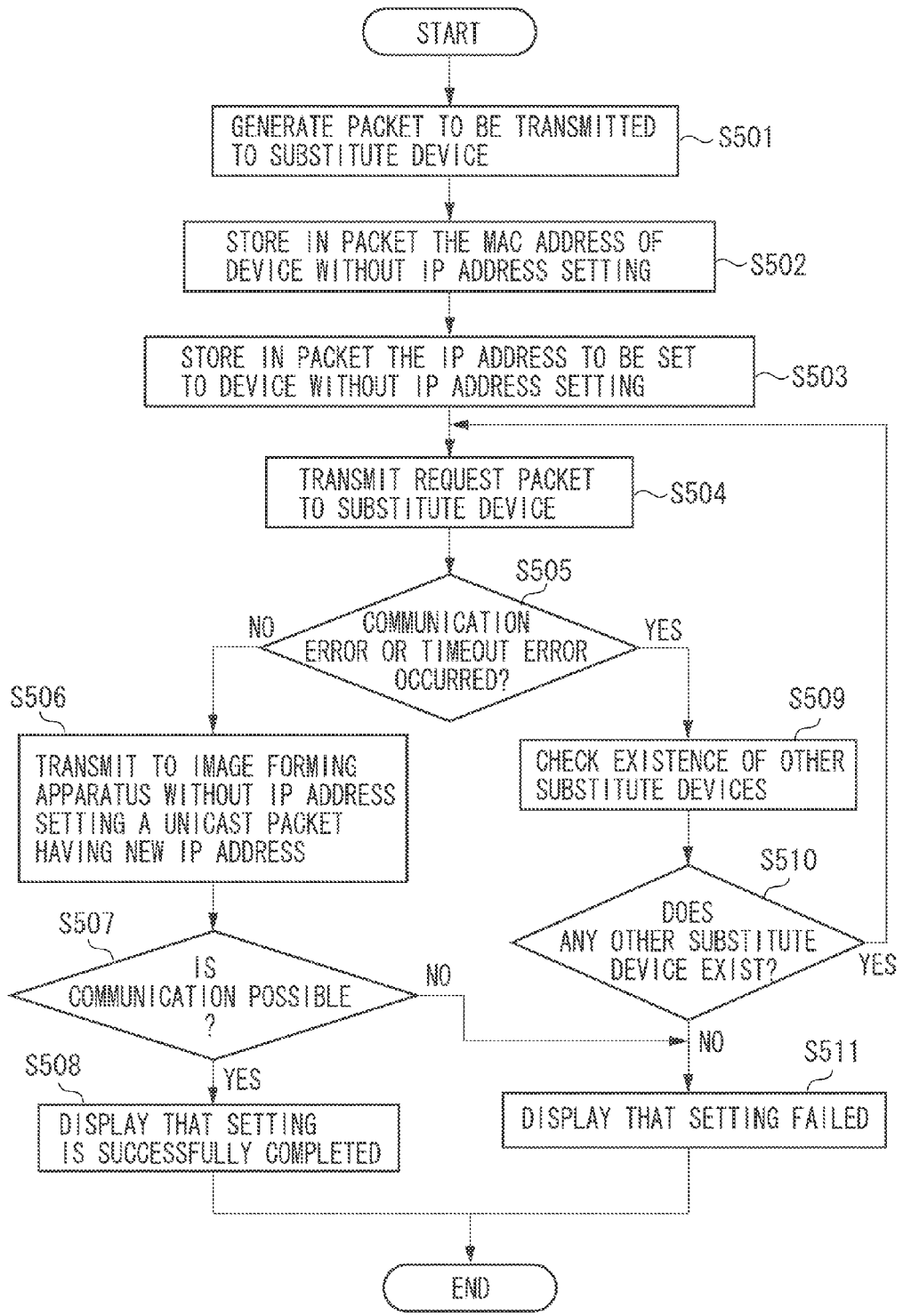

Processing performed by the host 101 to set a desired IP address to the image forming apparatus 104 having no IP address setting existing in a different subnet found in the processing in FIG. 4 will be described below. FIG. 5 is a flowchart illustrating the processing which is achieved when the CPU 201 loads a program from the ROM 202 and the storage apparatus 209 into the RAM 203 and then executes it.

In step S501, the host 101 generates a packet for requesting IP address setting to be transmitted to the substitute device 103. In step S502, the host 101 stores in the packet the MAC address of the image forming apparatus 104 having no IP address setting. In step S503, the host 101 stores in the packet the IP address to be set to the image forming apparatus 104. The IP address stored in the packet is determined in advance as an IP address to be set to the image forming apparatus 104. In step S504, the host 101 transmits the unicast packet for requesting IP address setting configured in the above-described processing, having a transmission destination of the substitute device 103 (see step 316 in FIG. 3).

In step S505, the host 101 determines whether a communication error or a timeout error occurred in the setting request packet transmitted in step S504. When the host 101 determines that the packet has been normally transmitted (NO in step S505), the processing proceeds to step S506. In step S506, the host 101 transmits to the image forming apparatus 104 having no IP address setting a unicast packet having a transmission destination of the new IP address. In step S507, the host 101 determines whether communication is successfully completed. When the host 101 determines that neither a communication error nor a timeout error occurred (YES in step S507), the processing proceeds to step S508. In step S508, the host 101 instructs the display apparatus 207 to display that setting is successfully completed. When the host 101 determines that communication failed (NO in step S507), the processing proceeds to step S511. In step S511, the host 101 instructs the display apparatus 207 to display that setting failed.

Otherwise, when the host 101 determines that a communication error or a timeout error occurred (YES in step S505), the processing proceeds to step S509. In step S509, the host 101 checks the existence of other substitute devices according to the processing in FIG. 4. However, when a plurality of substitute devices has been found in the processing in FIG. 4, these other substitute devices may be identified based on stored information, or being searched for in step S509 according to the processing in FIG. 4. In step S510, the host 101 determines whether other substitute devices exist. When the host 101 determines that other substitute devices exist (YES in step S510), the processing returns to step S504 to repeat processing from step S504. When the host 101 determines that other substitute devices do not exist (NO in step S510), the processing proceeds to step S511. In step S511, the host 101 instructs the display apparatus 207 to display that setting failed.

FIG. 6 illustrates an example screen displayed by the display apparatus 207. The screen indicates the result of search processing illustrated in FIG. 4, i.e., the image forming apparatus 104 having no IP address setting, the substitute device 103, and image forming apparatuses existing in the same subnet as the host 101. Referring to FIG. 6, Printer A 601 corresponds to the image forming apparatus 104, Printer B 602 corresponds to the substitute devices 103, and Printer C 603 corresponds to an image forming apparatus existing in the same subnet as the host 101.

Figure 7:
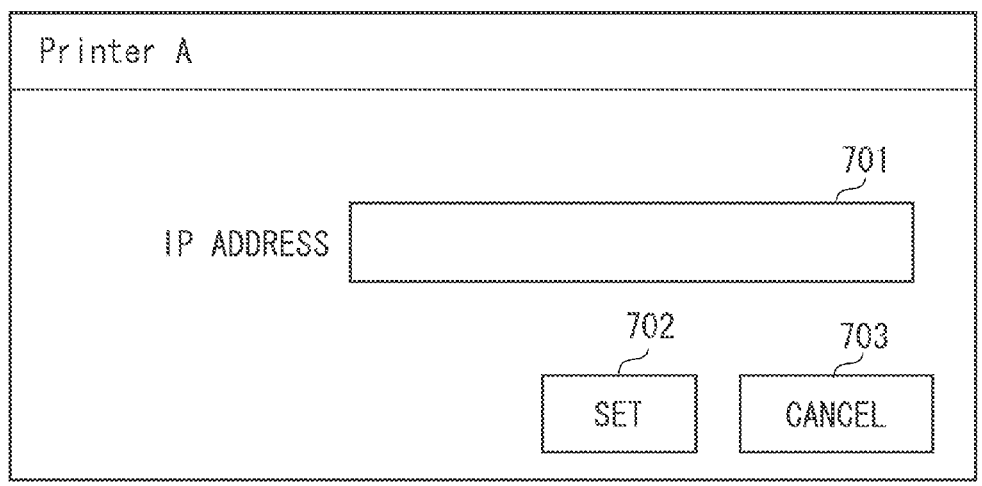

FIG. 7 illustrates an example screen displayed by the display apparatus 207. This screen enables the user to input an IP address to be set to the image forming apparatus 104 having no IP address setting in the processing illustrated in FIG. 5. For example, when the user selects Printer A 601 in the screen illustrated in FIG. 6, the screen is changed to display FIG. 7. The user inputs in an area 701 an IP address to be set to the image forming apparatus 104. When the user presses a SET button 702 with an IP address input in the area 701, the processing in FIG. 5 is started. When the user presses a CANCEL button 703, the IP address setting processing is canceled.

FIG. 8 is a flowchart illustrating the processing by the substitute device 103 in the processing illustrated in FIG. 3. The flowchart in FIG. 8 is achieved when the CPU 213 loads a program from the ROM 214 and the storage apparatus 222 of the substitute device 103 into the RAM 215 and then executes it.

In step S801, the substitute device 103 receives the multicast packet from the host 101 (see step 304 in FIG. 3). In step S802, the substitute device 103 transmits the limited broadcast packet illustrated in step 305 in FIG. 3. In step S803, the substitute device 103 receives from the image forming apparatus 104 a reply to the limited broadcast packet illustrated in step 306 in FIG. 3. In step S804, based on the result of reception in step S803, the substitute device 103 determines whether the image forming apparatus having no IP address setting subjected to IP address setting exists in the same subnet. Specifically, when the reply can be received in step 306, the substitute device 103 determines that a target image forming apparatus exists. Otherwise, when the reply cannot be received in step 306, the substitute device 103 determines that a target image forming apparatus did not exist. In step S805, as the result of the determination in step S804, the substitute device 103 determines whether an image forming apparatus having no IP address setting exists. When the substitute device 103 determines that an image forming apparatus having no IP address setting exists (YES in step S805), the processing proceeds to step S806. Otherwise, when the substitute device 103 determines that an image forming apparatus having no IP address setting does not exist (NO in step S805), the processing proceeds to step S808.

In step S806, the substitute device 103 extracts the MAC address of the image forming apparatus 104 having no IP address setting included in the packet received in step S803. In step S807, the substitute device 103 stores in a reply packet to be transmitted to the host 101 through steps 307 and 308 in FIG. 3 the MAC address of the image forming apparatus 104 extracted in step S806.

In step S808, the substitute device 103 stores in the reply packet to be transmitted to the host 101 through steps 307 and 308 in FIG. 3 the MAC address of the substitute device 103 itself. When the processing proceeds to step S808 from step S807, the substitute device 103 stores in the packet the MAC address of the image forming apparatus 104 and the MAC address of the substitute device 103. When the processing proceeds to step S808 from step S805, the substitute device 103 stores in the packet only the MAC address of the substitute device 103. The MAC address is stored so as to be recognized which apparatus it belongs to. In step S809, as a reply to the multicast packet illustrated in step 301 in FIG. 3, the substitute device 103 transmits to the host 101 the packet generated by the above-described processing (see step 307 in FIG. 3).

FIG. 9 is a flowchart illustrating the processing by the substitute device 103, illustrated in step 316 and subsequent steps in FIG. 3. When the substitute device 103 determines that an image forming apparatus having no IP address setting exists (YES in step S805), the processing proceeds to the flowchart illustrated in FIG. 9 after completion of the processing of the flowchart illustrated in FIG. 8. However, for example, when the MAC address of the image forming apparatus 104 is known, the processing in FIG. 8 may be omitted. This flowchart in FIG. 9 is achieved when the CPU 213 loads a program from the ROM 214 and the storage apparatus 222 of the substitute device 103 into the RAM 215 and then executes it.

In step S901, the substitute device 103 receives the unicast packet for requesting IP address setting transmitted by the host 101 (see step 316 in FIG. 3). The packet includes the IP address to be set to the image forming apparatus 104 input in the area 701 illustrated in FIG. 7, and the MAC address of the image forming apparatus 104. In step S902, the substitute device 103 extracts from the request packet (received in step S901) the IP address to be set to the image forming apparatus 104 and the MAC address of the image forming apparatus 104.

In step S903, as illustrated in step 317 in FIG. 3, the substitute device 103 transmits to the MAC address (extracted in step S902) the unicast packet for setting the IP address (extracted in step S902) to the image forming apparatus 104. Upon reception of the unicast packet, the image forming apparatus 104 stores in the storage apparatus 222 the IP address included in the received packet, and sets the IP address as an IP address for its own network communication. When the IP address has normally been set, the image forming apparatus 104 transmits to the substitute device 103 a reply notifying the normal completion of IP address setting (see step 318 in FIG. 3). Otherwise, when the IP address has not normally been set, the image forming apparatus 104 transmits to the substitute device 103 a reply packet notifying the occurrence of a setting error.

In step S904, the substitute device 103 determines whether the IP address has normally been set to the image forming apparatus 104. When the substitute device 103 receives from the image forming apparatus 104 a reply notifying the normal completion of IP address setting (YES in step S904), the processing proceeds to step S906. Otherwise, when the substitute device 103 receives from the image forming apparatus 104 a reply notifying the occurrence of a setting error, when the substitute device 103 does not receive a reply therefrom within a predetermined time period, or when a communication error occurs (NO in step S904), the processing proceeds to step S905. In step S905, the substitute device 103 stores in the reply packet to the packet (received from the host 101 in step S901) information about the occurrence of a setting error. In step S906, the substitute device 103 stores in the reply packet the information about the completion of IP address setting.

In step S907, the substitute device 103 transmits to the host 101 the reply packet (including the information stored in step S905 or S906) in response to the packet received in step S901 (see step 319 in FIG. 3). Upon reception of the reply packet, after making sure that IP address setting is normally completed, the host 101 stores in the storage apparatus 209 information about the image forming apparatus 104 associated with the set IP address.

As described above, the present exemplary embodiment makes it easier to set an IP address to an apparatus having no IP address setting existing beyond the router 102.

Although, in the above-described exemplary embodiment, an IP address is set to one apparatus having no IP address setting, the processing is not limited thereto. An IP address may be set to a plurality of apparatuses having no IP address setting. In this case, when a plurality of apparatuses having no IP address setting is found beyond the router 102 in the above-described processing, the host 101 acquires the MAC address of a plurality of apparatuses having no IP address setting. Then, the host 101 stores in a packet for requesting IP address setting respective IP addresses to be set to apparatuses having each MAC address. Then, the substitute device 103 sets an IP address to each apparatus through a multicast packet.

Although, when requesting IP address setting in the above-described exemplary embodiment, the host 101 identifies the target MAC address and requests IP address setting based on the MAC address, the processing is not limited thereto. For example, the processing for requesting IP address setting is assigned a unique identification (ID), and, when an image forming apparatus having no IP address setting is identified, the host 101 requests IP address setting based on the ID. The substitute device 103 stores in the storage apparatus 222 the MAC address of the image forming apparatus in association with the ID. Upon reception of a packet for requesting IP address setting based on the ID from the host 101, the substitute device 103 sets an IP address (included in the setting request) to an apparatus having the stored MAC address. This enables the host 101 to set the IP address to the image forming apparatus 104 without specifying the MAC address.

Although, in the above descriptions, the apparatus for requesting IP address setting is a PC, and the substitute device 103 and the apparatus subjected to IP address setting are image forming apparatuses, the device configuration is not limited thereto. These apparatuses may be devices of other types. The apparatus subjected to IP address setting may be a general-purpose apparatus as long as it is capable of receiving an IP address setting instruction and setting its own IP address. The above-described device configuration may also be applied to a non-TCP/IP environment.

The present exemplary embodiment is achieved also by performing the following processing. Specifically, software (program) for implementing the above-described functions of the exemplary embodiment is supplied to a system or an apparatus via a network or various storage media. The system or a computer (CPU and a microprocessor unit (MPU)) of the apparatus loads a program into memory and then executes it. The program may be executed either by one computer or a plurality of computers in a collaborated way. All of the above-mentioned processing do not need to be implemented by software. A part or whole of the processing may be implemented by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-112773 filed May 19, 2011, which is hereby incorporated by reference herein in its entirety. cm What is claimed is:

What is claimed is:

1. A data communication system including a first apparatus having a valid IP address and a second apparatus having a valid IP address connected with the first apparatus via a router, the system comprising:
a first search unit of the first apparatus configured to transmit a first search request by multicast message for searching for an apparatus in a different subnet via the router;
a second search unit of the second apparatus configured to transmit a second search request by limited broadcast message for searching for a third apparatus having no valid IP address that exists in a same subnet as the second apparatus according to the first search request;
a first transmitting unit of the third apparatus configured to transmit a response to the second search request, the response comprising a MAC address of the third apparatus;
a notification unit of the second apparatus configured to transmit a response to the first search request, the response comprising the MAC address of the third apparatus to the first apparatus;
a request unit of the first apparatus configured to transmit a unicast message comprising a setting request including a new IP address and the MAC address of the third apparatus to the second apparatus; and
a setting unit of the second apparatus configured to set the new IP address to the third apparatus specified by the MAC address.

2. A data communication apparatus comprising:
a first receiving unit configured to receive a first search request by multicast message for searching for an apparatus which a host apparatus in a different subnet issued via a router;
a search unit configured to transmit a second search request by limited broadcast message for searching for an apparatus having no valid IP address that exists in a same subnet as the data communication apparatus according to the first search request;
a second receiving unit configured to receive a response to the second search request, the response to the second search request comprising a MAC address of the apparatus having no valid IP address;
a notification unit configured to transmit a response to the first search request, the response to the first search request comprising the MAC address of the apparatus having no valid IP address;
a third receiving unit configured to receive a unicast message comprising a setting request including a new IP address and the MAC address of the apparatus having no valid IP address from the host apparatus to which the response to the first search request by multicast message was transmitted; and
a setting unit configured to set the new IP address to the apparatus having no valid IP address.

3. The apparatus according to claim 2, wherein a setting complete notification is transmitted to the host apparatus in a case where the new IP address is set to the apparatus having no valid IP address.

4. The apparatus according to claim 2, wherein the router does not transmit a response from the apparatus having no valid IP address to the host apparatus.

5. An address setting method in a data communication system comprising a data communication apparatus, the method comprising:
receiving, by a first receiving unit, a first search request by multicast message for searching for an apparatus which a host apparatus in a different subnet issued via a router;
transmitting, by a search unit, a second search request by limited broadcast message for searching for an apparatus having no valid IP address that exists in a same subnet as the data communication apparatus according to the first search request;
receiving, by a second receiving unit, a response to the second search request, the response to the second search request comprising a MAC address of the apparatus having no valid IP address;
transmitting, by a notification unit, a response to the first search request, the response to the first search request comprising the MAC address of the apparatus having no valid IP address;
receiving, by a third receiving unit, a unicast message comprising a setting request including a new IP address and the MAC address of the apparatus having no valid IP address from the host apparatus to which the response to the first search request by multicast message was transmitted; and
setting, by a setting unit, the new IP address to the apparatus having no valid IP address.

6. The method according to claim 5, wherein a setting complete notification is transmitted to the host apparatus in a case where the new IP address is set to the apparatus having no valid IP address.

7. The method according to claim 5, wherein the router does not transmit a response from the apparatus having no valid IP address to the host apparatus.

8. A non-transitory computer-readable storage medium storing computer-executable instructions for causing a computer to execute the address setting method according to claim 5.

* * * * *